United States Patent [19]

Agostinelli et al.

[11] Patent Number: 4,805,012

[45] Date of Patent: Feb. 14, 1989

[54] SYSTEM FOR HIGH RESOLUTION EXPOSURE ADDRESS WITH COARSER RESOLUTION EXPOSING ARRAY

[75] Inventors: John A. Agostinelli, Rochester; José M. Mir, Webster, both of N.Y.

[73] Assignee: Eastman Kodak Company, Rochester, N.Y.

[21] Appl. No.: 99,953

[22] Filed: Sep. 23, 1987

[51] Int. Cl.⁴ .................................................. H04N 1/46
[52] U.S. Cl. ........................................ 358/75; 358/296
[58] Field of Search ................... 358/75, 256, 302, 300

[56] References Cited

U.S. PATENT DOCUMENTS

| | | | |
|---|---|---|---|
| 3,264,611 | 8/1966 | Lohmann | 340/146.3 |
| 4,229,095 | 10/1980 | Mir | 358/75 X |
| 4,374,397 | 2/1983 | Mir | 358/75 |
| 4,375,647 | 3/1983 | Mir | 358/75 |
| 4,375,648 | 3/1983 | Mir | 358/75 |
| 4,375,649 | 3/1983 | Mir et al. | 358/75 |
| 4,377,753 | 3/1983 | Mir | 250/578 |
| 4,378,567 | 3/1983 | Mir | 358/296 X |
| 4,446,479 | 5/1984 | Kurtz | 358/75 |
| 4,449,153 | 5/1984 | Tschang | 358/75 X |
| 4,566,016 | 1/1986 | Masuda | 358/296 X |
| 4,667,099 | 5/1987 | Arai et al. | 358/293 X |

Primary Examiner—James J. Groody
Assistant Examiner—E. Anne Faris
Attorney, Agent, or Firm—John D. Husser

[57] ABSTRACT

An electronic imaging system for light exposing a linear image zone at relatively high resolution which comprises a light source array having a plurality of selectively activatable pixel exposing elements of approximately equal width (W) spaced at generally equal linear intervals (S), means for forming an image of the light source array at a linear image zone and means for scanning the light source array image linearly along the image zone in number of successive increments (M) wherein M is an integer approximately equal to $(S \div W) \cdot X$, and X is the number of different colors to be exposed during a line scan.

12 Claims, 3 Drawing Sheets

SYSTEM FOR HIGH RESOLUTION EXPOSURE ADDRESS WITH COARSER RESOLUTION EXPOSING ARRAY

FIELD OF THE INVENTION

The present invention relates to electro-optic imaging, e.g. with arrays of light valving or light emitting devices, and more particularly to systems for using such devices in a manner that increases the exposure resolution, in comparison to the resolution of the exposing array.

BACKGROUND OF THE INVENTION

As the different technologies of electronic imaging output evolve, there is a continuing search for improved ways to increase exposure resolution, i.e. provide more picture elements (pixels) per unit distance and area. For example, U.S. Pat. No. 4,377,753 describes an electronic imaging system wherein a relatively coarse resolution linear light valve array is utilized to effect higher resolution line exposures on a record medium. In this system each array element has an associated lens; and exposing light is directed to the lens/light valve array matrix from a plurality of different directions, sequentially, to provide a corresponding plurality of different pixel exposures on the record medium. The light valve array of this system comprises electrically addressable PLZT elements sandwiched between crossed polarizers and those elements are addressed at each light direction sequence to selectively pass or block light to their then-addressed exposure locations. Thus, the system exposes the plurality of pixels comprising a line in a multiplex fashion. Such a system simplifies the array fabrication (e.g., from the viewpoint of fewer addressing electrodes) and simplifies the requisite address circuitry (from the viewpoint of fewer drivers). However, fairly complex optical structures are required.

U.S. Pat. No. 4,374,397 describes somewhat optically simpler imaging systems that simplify the driver electronics by using (i) sets of coarse and high resolution light valving arrays and (ii) locationally interlaced addressing sequences. However, these imaging systems still require high resolution addressing electrode structures and correspondingly difficult array fabrications.

SUMMARY OF THE INVENTION

One significant purpose of the present invention is to provide constructions for high resolution electronic imaging which offer important advantages from the viewpoints of addressing electronics and optical system simplicity.

To accomplish this purpose, the present invention provides a system that includes an object array comprising a plurality of selectively activatible light exposure means disposed in spaced relation along a linear direction in an object plane, each light exposure means having approximately the same linear width dimension and being respectively separated by generally equal spaces; means for moving successive line portions of a record medium through a linear imaging zone; means for imaging the object array along the linear imaging zone; means, located along the optical path of the imaging means, for scanning the light image of the object array to a plurality of different positions at the linear imaging zone; and means for selectively activating exposure means of the object array, at each of such plurality of positions, in accordance with an input image information signal.

In one preferred embodiment, the present invention constitutes an electronic imaging system for light exposing linear image zone at relatively high resolution which comprises a light source array having a plurality of selectively activatible pixel exposing elements of approximately equal width (W) spaced at generally equal linear intervals (S), means for forming an image of the light source array at a linear image zone and means for scanning the light source array image linearly along the image zone in number of successive increments (M) wherein M is an integer approximately equal to $(S \div W).X$, and X is the number of different colors to be exposed during a line scan.

In another preferred aspect, the present invention provides first grating means located proximate said array and having a spatial frequency approximately equal to $1/W$; means for scanning light passing through the first grating onto second grating means, having a spatial frequency F/W (F being the system magnification), in synchronism with the indexing of the object array's image and means for (i) electro-optically detecting the scanned light passing the second grating and (ii) controlling the incremental stepping of the object array image in accord with such detection.

In another preferred embodiment, the object array comprises different color exposing means arranged in a repeating serial pattern and the scanning means indexes the light image (M) increments across the linear imaging zone, whereby pixel areas are addressable (X) times, respectively with one of each of the different color exposing means.

BRIEF DESCRIPTION OF THE DRAWINGS

The subsequent description of preferred embodiments refers to the attached drawings wherein.

DETAILED DESCRIPTION OF THE PREFERRED EMBODIMENTS

Figure 1:
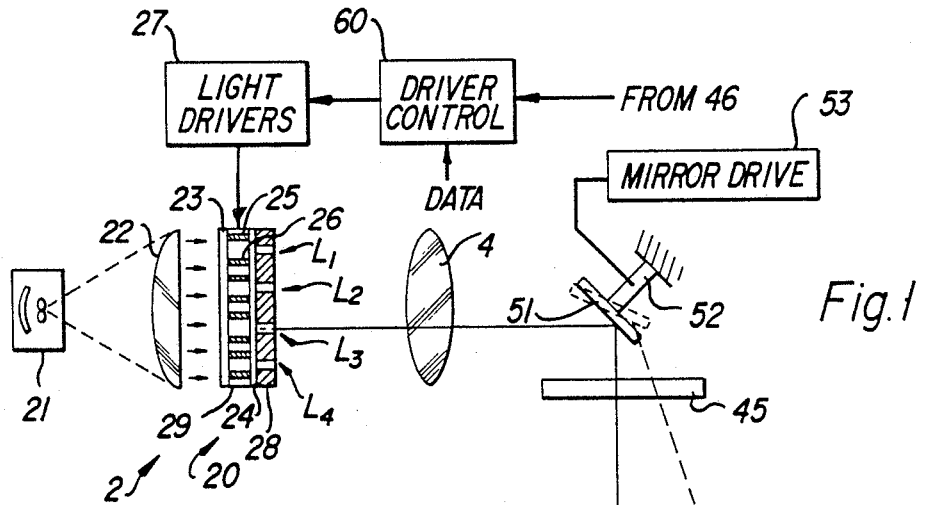
FIG. 1 is a schematic illustration of one preferred exposing system in accord with the present invention.

The embodiment of the present invention shown in FIG. 1 is a multiplexing printer comprising, in general, an object array sub-system 2 providing a plurality of selectively activatible exposure elements, a print station 3 constructed and located to transport successive line portions of print medium M to and through a print zone L, lens means (represented by lens 4) that is constructed and located to form an image of the object array 2 at the print zone (at a selected magnification F, e.g. 1:1, 2:1, 1:2, etc.) and a scan sub-system 5 that is constructed and located to index the light image of object array sub-system 2 to different locations at the print zone L.

The object array sub-system 2 includes a light source 21 providing uniform illumination to a collimator lens 22, which in turn directs collimated light onto the ingress polarizer element 23 of light valve array 20. The light valve array 20, shown in more detail in FIG. 2, also comprises an electro-optic panel 29, which is sandwiched between ingress polarizer 23 and egress polarizer 24. The panel 29 is formed to have a plurality of discrete exposure portions by construction of spaced electrode structures 25, 26 in a manner which enables selective application of an electrical field in a direction transverse to the direction of light passing through the panel. Such light valve structures are known in the art, e.g. see U.S. Pat. Nos. 4,371,892 and 4,569,573. In general, such arrays function with the directions of the polarizers 23, 24 at 90° relative to each other, and the electro-optic panel 29 (e.g. formed of PLZT material) is adapted to change the polarization direction of passing light by 90° when an activating electric field is applied across the electrodes. Usually one electrode 25, e.g. at ground potential, and the other is an address electrode, selectively energizable by driver circuits 27. Thus when the energizable electrode 25 is energized, the field between it and reference electrode 26 will cause the electro-optic material therebetween to change the direction of polarized light from ingress polarizer 23 by 90°; therefore such modulated light will pass through egress polarizer 24. When the address electrode 25 of an array pixel portion is not energized, there will be no change in the polarization of light passing that modulator panel portion and such light will be blocked by the egress polarizer. In the FIGS. 1 and 2 embodiment a mask layer 28 is provided, e.g. formed on egress polarizer 24, and comprises light transparent portions 43a, aligned between electrode pairs, and light opaque portions 43b, interspaced between those transparent portions. In another preferred embodiment (not shown), the mask layer 28 is formed directly on the egress surface of the modulator panel 29, which obviates alignment problems.

While the embodiments of the present invention employ illuminated PLZT type light valve arrays as the object sources for selectively activatible exposures, one skilled in the art will appreciate that other light exposure means, e.g. light emitting diode arrays or illuminated liquid crystal light valve arrays can also be utilized. Similarly, while the preferred embodiment of the present invention employs a mirror 51 mounted on a bimorph bender element 52 to controllably index the light image from the object array 2, other galvo-mirror systems and image scanner systems, e.g., rotating polygon mirrors, can be utilized.

As shown in FIG. 1, the bimorph bender element 52 is controllably driven by mirror drive circuit 53 to move mirror 51 between the solid and dotted line position shown (in successive increments, or in a continuous pass), so as to index the image of the masked face of light valve array at different locations on the line of record medium M (e.g. photosensitive film or paper) then present at the image zone of station 3. As illustrated, the station 3 can comprise a translatory stage 31 driven by stage drive 32 to shift successive line portions of the supported image medium into alignment at print zone L with the line image from lens system 4 and mirror 51. Although the image of light valve array is magnified at the print station 3 in FIG. 1, it will be appreciated that such image can be at unit magnification or less, as the application requires.

Figure 3:
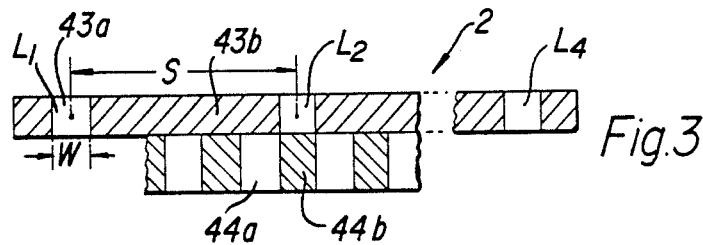
FIG. 3 is a diagram showing size and space relations of the FIG. 2 light valve array.

Referring now to FIG. 3, as well as FIG. 1, it can be seen that, in accord with the present invention, the object source 2 is constructed so that its exposing elements $L_1$-$L_4$ have a predetermined width (W) in the direction of array length. Also, the individual elements are spaced along the length direction with a predetermined center-to-center spacing (S) and have intermediate opaque sections 43b formed by portions of mask 28.

With a system constructed according to the present invention, as described above, the mirror drive circuit 53 and drive control circuit 60 can be coordinated to effect a line exposure in accordance with the present invention. Thus the circuits operate so that exposing source $L_1$ will sequentially address pixel portions $P_{1-1}$ to $P_{1-6}$ at the print zone, source $L_2$ will sequentially address pixel portions $P_{2-1}$ to $P_{2-6}$ at the print zone, source $L_3$ will sequentially address pixel portions $P_{3-1}$ to $P_{3-6}$ at the print zone and source $L_4$ will sequentially address pixel portions $P_{4-1}$ to $P_{4-6}$ at the print zone. This general procedure can be effected in various ways; however, two main features are important. First, the number (M) of sequential exposing actuations to be effected with each light source is selected based on the ratio $(S \div W) \cdot X$ of the exposing element spacing, along the length of the array, to the exposing element width in the direction of the array length, where X is the number of different color exposures per pixel to be effected at the print zone. In the monochrome (X=1) exposing system discussed thus far with respect to FIGS. 1-3, the $S \div W$ ratio is 6, and the discrete locations available for address, e.g. by the source $L_1$, therefore comprise the six pixel portions $P_{1-1}$ to $P_{1-6}$. If desired, the $S \div W$ ratio can differ slightly from the integer number of multiplexed printing sequences performed at the linear image zone. For example, if it is preferred to provide a slight overlap of exposed pixel portions, the $S \div W$ ratio can be somewhat more than the number of multiplexing exposure sequences (M). If a slight spacing is desired between addressed pixel portions, $S \div W$ can be slightly greater than the number of addressed pixel portions. The selection of a preferred $S \div W$ ratio will depend to some extent on the resolution of the optical system. For good results the indexing should be such that the overlap or spacing between pixels as exposed at the print zone not differ by more than about 50% from the condition of edge-to-edge abutment. However, for best imaging quality with a single light color, the pixel portions, e.g. $P_1'$-$P_6$ should be uniformly spaced across the $L_1$ sector of the image zone and the number of discrete pixel portions within a sector should be approximately equal to $S \div W$.

Considering the foregoing it can be seen that a second main feature of general procedures according to the present invention is to predeterminedly synchronize the movement of mirror 51 with the light drivers circuit 27. Thus, it is important that, in each sector $L'_1$, $L'_2$, etc., the addressed pixel portions (e.g. $P_{1-1}$ to $P_{1-6}$) of the sector are uniformly spaced along the sector length. Conceptually the aim is to actuate the light sources at increments of image movement at the image zone of about the exposing element width (W) times the system magnification factor (F).

Figure 2:
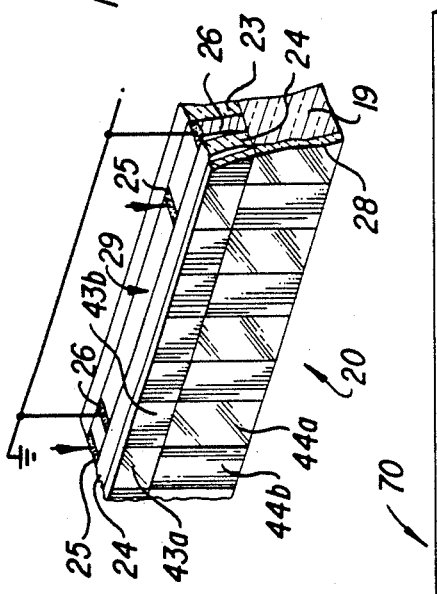
FIG. 2 is a perspective view of a portion of a light valve array constructed to function in the FIG. 1 embodiment of the present invention.

FIGS. 1–4 illustrate one preferred approach for implementing such control in accord with the invention. As best shown in FIGS. 2 and 3, mask 28 also comprises a plurality of alternating opaque and transparent portions 44a and 44b having a spatial frequency equal to $1 \div W$. In order to allow light from source 21 to pass through grating portions 44a, the support 19 adjacent that grating is transparent. If desired, the support could be omitted or the support could be an electro-optic polarizer sandwich with electrodes energized to a light-transmitting condition.

Figure 4:
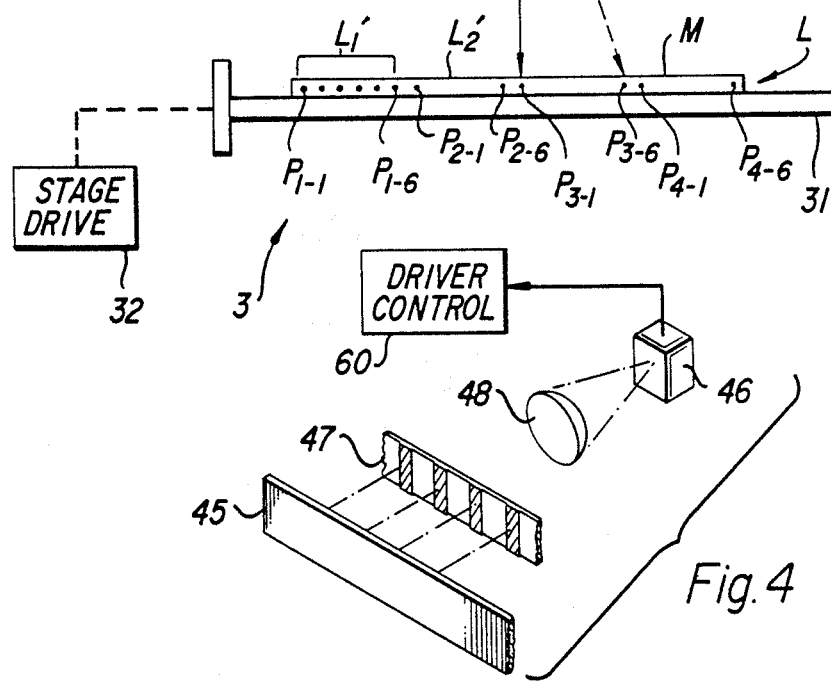
FIG. 4 is a schematic perspective view further illustrating other portions of the FIG. 1 system.

Referring to FIGS. 1 and 4, it can be seen that a mirror 45 is located along the edge of the optical path of the light passing from source 21 through the grating 44a, 44b of mask 28 so as to direct this light to a photodetector 46 via a grating 47 and lens 48. The grating 47 is constructed to have the same spatial frequency as grating 44a, 44b of mask 28, as imaged at the exposure zone L. That is the grating 47 has a spatial frequency of $F \cdot (1 \div W)$ where F is the system magnification. This cooperative grating system produces a high contrast Moiré pattern; and, as the mirror 51 scans, the light transmitted through grating 47 produces a sinusoidal voltage output signal from photodetector. Thus, each voltage maximum (or minimum) of the photodetector signal will correspond to a multiplex event, i.e. a signal for actuating driver control circuit 60 to gate printing information to the light valve drivers. This synchronization technique is highly useful in avoiding nonuniformities caused by flutter in the bimorph driven mirror. While the optical grating position synchronization system just described in advantageous, other position detection systems, e.g. shaft encoders or drive signal counters, can be used to perform the requisite functions of synchronization. In certain embodiments of the FIG. 4 system lens 48 is not needed.

In operation, print data is input to the driver control (which can be a portion of a microprocessor unit) from a buffer memory where it is stored in a format suitable to load the drivers for sources $L_1$ to $L_4$ with print/no-print information for each of their respective sectors of image pixel portions. That is, at the first stage of the line exposure sequence, the gates to the drivers for sources $L_1$ to $L_4$ are loaded in parallel with data respectively for pixel portions $P_{1-}$, $P_{2-1}$, $P_{3-1}$ and $P_{4-1}$. At the appropriate sequence signal from detector 46 (indicating that mirror 51 is in the position to address those pixel portions), the gates are signalled to operate drivers for sources $L_1$-$L_4$ in accordance with loaded print/no print data and light is directed to the pixel portions accordingly. Thereafter, data for positions $P_{1-2}$, $P_{2-2}$, $P_{3-2}$ and $P_{4-2}$ are loaded into the gates and await the signal from driver control that mirror 51 has moved to the next appropriate pixel address location. This sequence progresses until each sector has all pixel portions address and stage drive then advances the print stage while mirror 51 returns to the initial position. One skilled in the art will appreciate that a multi-level gray scale imaging of pixels can be achieved using techniques such as described in U.S. Pats. Nos. 4,378,568 or 4,449,153 in conjunction with the present invention.

Multicolor imaging can be effected by the system shown in FIGS. 1-4 by repeating the sequence described above with an insertion of a different color filter between successive line or page print sequences. However, referring to FIG. 5, there is shown a more preferred mode of multicolor printing in accord with the present invention. Thus, the light valve array shown in FIG. 5 comprises a composite polarizer, PLZT, mask unit 70 such as described with respect to FIG. 2; however, there are provided red (R), green (G) and blue (B) filter deposits 71, 72, 73 over each of the light source portions of the array. Such filter elements can be fabricated as described in U.S. Pat. No. 4,366,500 and, as shown, are arranged in successive series R, G, B. The array unit 70 has address and reference electrodes 25' and 26' and drivers 27' such as described above. As shown in the FIG. 6 diagram, the $S \div W$ ratio of the FIG. 5 light valve array is approximately 6, as was the case in the previously described embodiment. The array 70 shown in FIG. 5 has a light and opaque area index control grating 76 with a spatial frequency $1 \div W$, where W is the width of the green pixels of the array.

Figure 5:
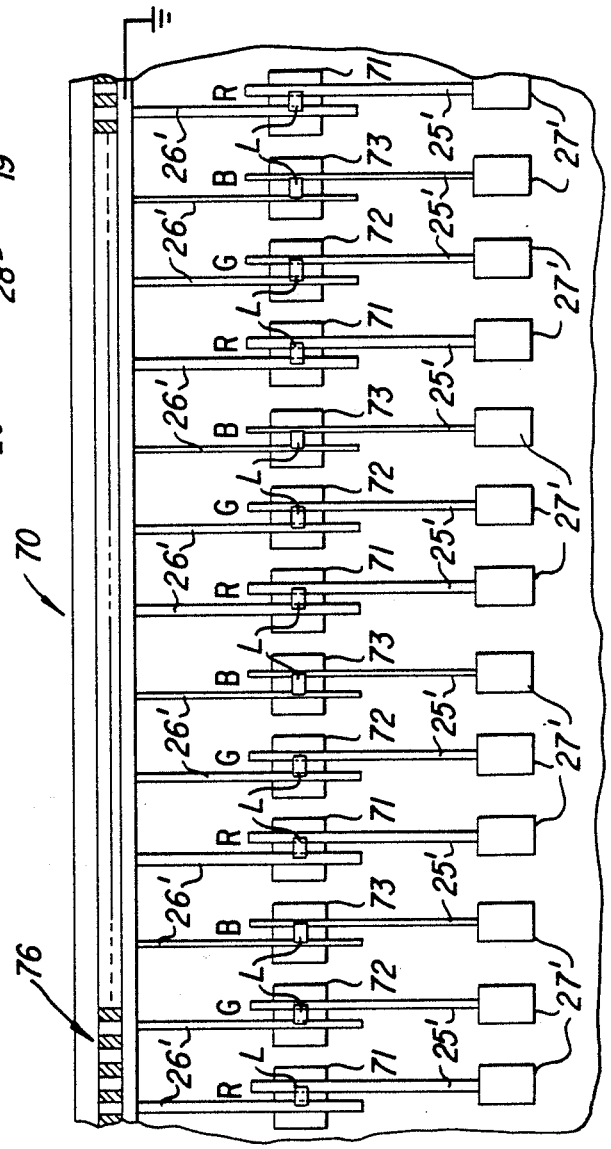
FIG. 5 is a schematic plan view of a light valve array constructed for use in a multicolor exposing system in accord with the present invention.

Exposing with the FIG. 5 embodiment functions in a manner similar to the FIGS. 1-4 embodiment. However, in this embodiment it is desired for each pixel portion of the print medium to be addressed by exposing elements of each different light color, in the illustrated embodiment by R, G and B. Thus, the total scan sector dimension should be about equal to the product of the number of different colors being exposed (X, here 3) times the inter-element spacing (S, here 6). For the illustrated embodiment then, the image of the light valve array should be indexed to 18 different positions of approximately the green exposing width magnitude (W). The R, G, B exposing elements shown in FIG. 5 have slightly different widths for equalizing half-wave voltages as described in concurrently filled U.S. patent application Ser. No. 100,058, entitled "Multicolor Light Valve Imaging Apparatus Having Electrode Constructions for Uniform Transmission". Where this is the case, green is the preferred "W" to use in selecting the spatial frequency of indexing. However, those widths W can be equal.

Figure 6:
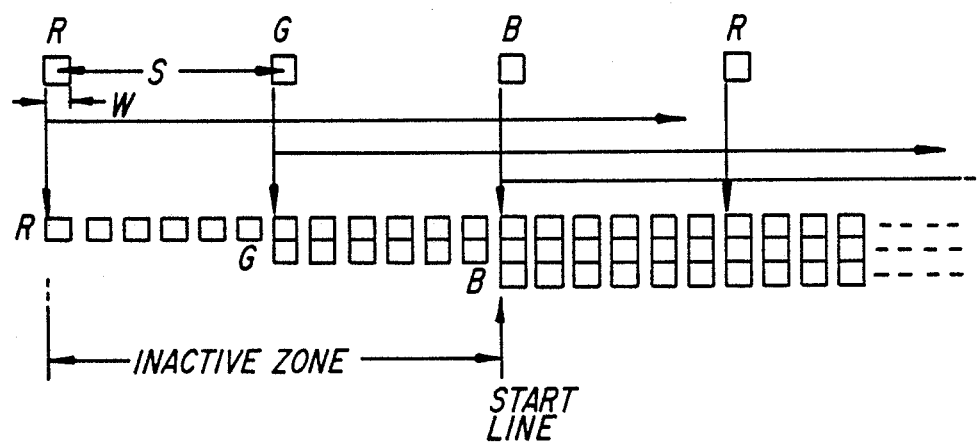
FIG. 6 is a diagram illustrating the operation of the FIG. 5 array in multicolor embodiments of the invention.

Data is formatted in computer buffers to be delivered to each light source pixel L in synchronization with the multiplexing of its image to a particular position on the print media line. As shown in FIG. 6 each pixel portion of a line can thus be addressed by light of each color without refeeding the media or changing filters. It will be noted in FIG. 6 that at the beginning and end portions of each line certain pixels will be inactive during a portion of the line scan. This can be accomplished simply by disabling appropriate high voltage drivers or loading "0" bits into the appropriate data buffers prior to the line scan count reaching the START LINE position shown in FIG. 6.

The invention has been described in detail with particular reference to preferred embodiments thereof, but it will be understood that variations and modifications can be effected within the spirit and scope of the invention.

We claim:
1. A system for selectively light-exposing a plurality of pixel portions forming a record medium line, said system comprising:
  (a) an object array comprising a plurality of selectively activatible light exposure means disposed in spaced relation along a linear direction in an object plane, said light exposure means each having approximately the same linear width dimension and being respectively separated by generally equal spaces;
  (b) means for moving successive line portions of a record medium through a linear imaging zone;
  (c) means for forming a light image of said object array along said linear imaging zone;
  (d) means, located along the optical path of said imaging means, for scanning the light image of said object array to a plurality of different positions at said linear imaging zone; and

(e) means for selectively activating exposure means of said object array, at each of said plurality of positions, in accordance with an input image information signal.

2. The invention defined in claim 1 wherein said scanning means comprises a movable light reflecting means for scanning said object array in said linear direction of said imaging zone.

3. The invention defined in claim 1 wherein said scanning means comprises a movable light directing member and means for moving said light directing member between start of line scan and end of line scan positions and wherein said activating means comprises means for sensing positions of said light directing member and means for signalling activation periods for said object array.

4. The invention defined in claim 3 wherein said sensing and signalling means signals activations at equal spatial increments of array image movement at said linear image zone.

5. A system for selectively light-exposing a plurality of pixel portions forming a record medium line, said system comprising:
  (a) an object array comprising a plurality of selectively activatible light exposure means disposed in spaced relation along a linear direction in an object plane, said light exposure means each having approximately the same width dimension W, in said linear direction, and having a generally equal center-to-center spacing along said linear direction;
  (b) means for presenting line portions of a record medium at a linear imaging zone of said system;
  (c) means for forming a light image of said object array along said linear imaging zone at a magnification F;
  (d) means, located along the optical path of said imaging means, for indexing the light image of said object array at said linear imaging zone to a plurality of different positions; and
  (e) means for selectively activating the exposure means of said object array, at increments of image movement at said image zone of approximately W.F, in accordance with an input image information signal.

6. A system for selectively light-exposing a plurality of pixel portions forming a record medium line, said system comprising:
  (a) an object array comprising a plurality of selectively activatible light exposure means disposed in spaced relation along a linear direction in an object plane, said light exposure means each having approximately the same width dimension W, in said linear direction, and being respectively separated by spaces so as to have generally equal center-to-center spacing dimensions S along said linear direction;
  (b) means for moving successive line portions of a record medium through a linear imaging zone of said system;
  (c) means for forming a light image of said object array along said linear imaging zone;
  (d) means, located along the optical path of said imaging means, for indexing the light image of said object array at said linear imaging zone to a plurality (M) of different positions, where $M \approx (S \div W).X$ and X is the number of different light colors which said array exposes; and
  (e) means for selectively activating the exposure means of said object array, at each of said plurality of positions, in accordance with an input image information signal.

7. The invention defined in claim 6 wherein: (i) said object array comprises a plurality of different color light source means in a repeating serial pattern (X being an integer greater than 1) and (ii) said indexing means indexes said light image a plurality of increments M across said linear imaging zone, whereby each pixel area is addressable X times, respectively with one of each of said different color light sources.

8. The invention defined in claim 6 wherein said activating means comprises first optical grating means having a spatial frequency equal to $1 \div W$; second optical grating means having a spatial frequency equal to $F.(1 \div W)$, where F is the magnification of said object array at said imaging zone; means for scanning light from said first grating onto said second grating means in synchronism with said indexing of object array image and means for (i) electro-optically detecting the light passing from said second grating and (ii) controlling said indexing of said object array image.

9. The invention defined in claim 6 wherein said indexing means comprises a reflective surface which is movable between a plurality of different orientations and means for moving said reflective surface sequentially into orientations which index said object array image at said different image zone positions.

10. The invention defined in claim 9 wherein said indexing means comprises a mirror mounted on a bimorph bender element.

11. The invention defined in claim 5 or 6 wherein said activating means comprises optical grating means with a spatial frequency of approximately 1/W.

12. An electronic imaging system for light exposing a linear image zone at relatively high resolution, said system comprising:
  (a) a light source array comprising a plurality of selectively activatible pixel exposing elements of width (W) spaced at linear intervals (S);
  (b) means for forming an image of said light source array at a linear image zone; and
  (c) means for scanning said light source array image linearly along said image zone in a number of equal and successive increments (M) approximately equal to $(S \div W).X$, where X is an integer representing the number of different colors to be exposed during a line scan.

* * * * *